United States Patent
Gram et al.

(10) Patent No.: US 12,441,837 B2
(45) Date of Patent: Oct. 14, 2025

(54) IMMOBILIZATION OF PHENOLIC COMPOUNDS

(71) Applicant: Spago Nanomedical AB, Lund (SE)

(72) Inventors: Andreas Gram, Höör (SE); Oskar Axelsson, Höör (SE); Rikard Larsson, Tagarp (SE)

(73) Assignee: Spago Nanomedical AB, Lund (SE)

( * ) Notice: Subject to any disclaimer, the term of this patent is extended or adjusted under 35 U.S.C. 154(b) by 728 days.

(21) Appl. No.: 17/780,839

(22) PCT Filed: Dec. 16, 2020

(86) PCT No.: PCT/EP2020/086591
§ 371 (c)(1),
(2) Date: May 27, 2022

(87) PCT Pub. No.: WO2021/122859
PCT Pub. Date: Jun. 24, 2021

(65) Prior Publication Data
US 2023/0039790 A1    Feb. 9, 2023

(30) Foreign Application Priority Data
Dec. 16, 2019 (EP) .................... 19216697

(51) Int. Cl.
    C08G 65/30     (2006.01)
    C08G 65/336    (2006.01)
(52) U.S. Cl.
    CPC ........... *C08G 65/30* (2013.01); *C08G 65/336* (2013.01)
(58) Field of Classification Search
    CPC ......... B01J 20/261–267; B01J 2208/00; B01J 2220/00; C08G 65/30; C08G 65/336; C08F 6/00; B01D 2257/00; B01D 15/00; B01D 2253/202; B01D 15/361
    See application file for complete search history.

(56) References Cited

U.S. PATENT DOCUMENTS

| | | | |
|---|---|---|---|
| 7,276,162 B2 * | 10/2007 | Burton | B01D 15/00 210/502.1 |
| 7,772,154 B2 | 8/2010 | Zhou et al. | |
| 2003/0138376 A1 * | 7/2003 | Ruhland | A61K 49/00 424/9.1 |
| 2019/0023841 A1 | 1/2019 | Nonaka et al. | |
| 2019/0284323 A1 | 9/2019 | Al Hamouz | |

FOREIGN PATENT DOCUMENTS

| | | | |
|---|---|---|---|
| CN | 1210512 A | 3/1999 | |
| CN | 101023120 A | 8/2007 | |
| CN | 106512964 B | 5/2019 | |
| GB | 1202839 A | 8/1970 | |
| JP | 2004507484 A | 3/2004 | |
| JP | 2008515897 A | 5/2008 | |
| JP | 2010513334 A | 4/2010 | |
| JP | 2019509280 A | 4/2019 | |
| WO | WO-8606589 A1 * | 11/1986 | ............... A23L 2/30 |
| WO | WO-2006086545 A1 * | 8/2006 | ............. C12N 15/10 |
| WO | WO-2018130713 A1 | 7/2018 | |

OTHER PUBLICATIONS

Rudin, A., et al., "Gel Permeation Chromatographic Analyses of Resole Phenolic Resins," Journal of Applied Polymer Science, 28: 2611-2622 (1983).
McDonald, P.D., and Hamilton, G.A., "Mechanisms of Phenolic Oxidative Coupling Reactions," J. Org. Chem., 5: 97-134 (1973).
Yeh, C.M., et al., "Combinatorial Liquid-Phase Synthesis of Structurally Diverse Benzimidazole Libraries," J. Comb. Chem., 2: 341-348 (2000).
Shin, H., and Moon, B., "Careful Investigation of the Hydrosilylation of Olefins at Poly(Ethylene Glycol) Chain Ends and Development of a New Silyl Hydride to Avoid Side Reactions," Journal of Polymer Science, 56: 527-536 (2018).
Shalit, H., et al., "Selective Oxidative Phenol Coupling by Iron Catalysis," Journal of Organic Chemistry, 84: 1677-1686 (2019).
International Search Report from corresponding PCT Application No. PCT/EP2020/086591 dated Apr. 26, 2021.
Written Opinion from corresponding PCT Application No. PCT/EP2020/086591 dated Apr. 26, 2021.

\* cited by examiner

*Primary Examiner* — Randy P Gulakowski
*Assistant Examiner* — Virginia L Stonehocker
(74) *Attorney, Agent, or Firm* — Harness Dickey & Pierce P.L.C.

(57) ABSTRACT

The present disclosure relates to a method of immobilizing a phenolic compound having a $M_w \geq 500$ g/mol, wherein the method comprises the steps of ionizing the phenolic compound by subjecting it to a base; and contacting, under agitation, the ionized phenolic compound with a cross-linked resin comprising the functionality of —C(=O)—CHXCH$_2$R, wherein X is chosen from the group consisting of Br, Cl, I, CN, OMs, OTs, or OTf, and R is H, CH$_3$ or an branched or unbranched alkyl having 1 to 8 carbon atoms, in the presence of a base and a solvent. The present disclosure also relates to a method of removing phenolic compounds having a $M_w \geq 500$ g/mol from a composition comprising compounds having at least one alkoxy silane group. The present disclosure also relates to the use of a method according to the present disclosure as well as to a product, from which at least one phenolic compound having a $M_w \geq 500$ g/mol has been removed by a method according to the present disclosure.

13 Claims, 3 Drawing Sheets

IMMOBILIZATION OF PHENOLIC COMPOUNDS

CROSS-REFERENCE TO RELATED APPLICATIONS

This patent application is national stage application under 35 U.S.C. § 371 of International Application No. PCT/EP2020/086591 filed on 16 Dec. 2020, which claims priority to European Application No. 19216697.3 filed on 16 Dec. 2019. The entire disclosures of each of the above recited applications are incorporated herein by reference.

TECHNICAL FIELD

The present disclosure relates to a method of immobilizing phenolic compounds having a molecular weight equal or greater than 500 g/mol.

BACKGROUND

Many phenolic compounds have a yellowish-brownish colour due to the presence of small amounts of oxidation products. Thus, if a phenolic compound is produced as a by-product for example in the synthesis of a pharmaceutical compound, the reaction mixture will have a yellowish-brownish colour due to oxidation products of the phenolic compound.

Phenolic compounds can often be removed from the reaction mixture by standard purification methods such as extraction, reverse-phase chromatography, straight phase silica chromatography, distillation, or fractional crystallization.

However, depending on the nature of the phenolic compound and/or the nature of other compounds in the mixture, the choice of purification method may be limited.

If the compound to be purified is sensitive to moisture, purification methods such as extraction or reverse-phase chromatography, which proceed under hydrolytic conditions, cannot be used to remove phenolic compounds from the mixture, since the compound sensitive to moisture will hydrolyze. Straight phase silica chromatography is unsuitable if the compound to be purified contains groups such as e.g. ethoxysilyl groups that react with the surface silanols of the silica.

Phenols having a high molecular weight, such as ≥500 g/mol, cannot be removed by distillation, even under reduced pressure. Furthermore, if the reaction mixture contains a product which has a molecular weight distribution such as e.g. a polymeric product, fractional crystallization cannot be used for purification.

Mixtures containing phenols of low to moderate molecular weight, i.e. ≤500 g/mol, can be purified by immobilization of the phenols to various activated resins, e.g. in *J. Comb. Chem.*, 2000, 2(1), 48-65, the attachment of the phenolic function of estradiol (Mw 282.38 g/mol) derivatives to a polystyrene resin is described.

However, as the molecular weight of the phenol(s) which are to be removed increases, the attachment of the phenols to activated resins becomes more difficult. It is well known that to immobilize larger molecules like enzymes, specialized macroporous resins are necessary and for those only the most elementary surface functionalities are available (e.g. www.sigma-aldrich.com product no. 564095-(aminomethyl)-polystyrene).

An object of the present disclosure is to overcome these problems.

SUMMARY

According to a first aspect, the above and other objects are achieved, in full or at least in part, by a method as defined by claim 1. According to this claim the above object is achieved by a method of immobilizing a phenolic compound having a molecular weight $(M_w) \geq 500$ g/mol, wherein the method comprises the steps of ionizing the phenolic compound by subjecting it to a base, and contacting, under agitation, the ionized phenolic compound with a crosslinked resin comprising the functionality of —C(=O)—CHXCH$_2$R, wherein X is chosen from the group consisting of Br, Cl, I, CN, OMs, OTs, or OTf, and R is H, CH$_3$ or a branched or unbranched alkyl having 1 to 8 carbon atoms.

The phenolic compound may be a phenolic compound having a specific molecular structure and thus having a specific molecular weight, i.e. not having a molecular weight distribution. Alternatively, the phenolic compound may be a phenolic compound comprising a polymeric moiety, i.e. a moiety with a number of monomers. The number of monomers in the polymeric moiety may vary between different individual molecules. Phenolic compounds comprising a polymeric moiety thus may have a molecular weight distribution, not a specific molecular weight.

As appreciated by the skilled person, the molecular weight of a phenolic compound having a specific molecular structure is the molecular weight as calculated based on the number and nature of the atoms of the phenolic compound. It may be measured by e.g. mass spectrometry (MS).

According to one embodiment, the molecular weight of a phenolic compound comprising a polymeric moiety, as used herein, refers to weight average molecular weight (also referred to as mass average molar mass or weight average molar mass). As appreciated by the skilled person, the weight average molecular weight may be determined by e.g. gel filtration or size-exclusion chromatography (SEC).

According to one embodiment, the weight average molecular weight is determined in accordance with ISO 16014-1:2019 and ISO 16014-5:2019 ("Determination of average molecular weight and molecular weight distribution of polymers using size-exclusion chromatography").

According to another embodiment, the weight average molecular weight is determined in accordance with ISO 16014-1:2019 in combination with any of ISO 16014-2:2019 to ISO 16014-4:2019.

According to a further embodiment, the weight average molecular weight is determined by SEC and verified using liquid chromatography-mass spectrometry (LC-MS) or high-performance liquid chromatography (HPLC). Preferably, the HPLC method is as described herein.

Such a method can be used to remove phenolic compounds, which cannot be removed from a mixture by traditional methods, such as extraction, reverse-phase chromatography, straight phase silica chromatography, distillation, or fractional crystallization. Furthermore, such a method may be used even in the presence of compounds that are sensitive to moisture. Importantly, phenolic compounds having a high molecular weight, up to 5,000 g/mol, such as ≥500 g/mol, ≥1,000 g/mol, ≥1,500 g/mol, ≥2,000 g/mol, ≥2,500 g/mol, ≥3,000 g/mol, ≥3,500 g/mol, ≥4,000 g/mol, ≥4,500 g/mol, can be scavenged by the resin and thus removed from a mixture.

The method may be used for removing phenolic compounds having a $M_w \geq 500$ g/mol from a mixture comprising compounds that are sensitive to moisture.

The method may be used for removing phenolic compounds having a $M_w \geq 500$ g/mol from a mixture comprising compounds that contain at least one alkoxysilane group, so called alkoxy silanes. The alkoxy silane group may be an ethoxysilyl group.

An additional advantage of the method is that masked phenols, e.g. phenols protected by hydrolysis sensitive silanes, may be hydrolysed and removed from the mixture.

The agitation may be achieved in a multitude of ways, e.g. shaking, mechanical agitation, mechanical stirring or agitation by bubbling with an inert gas or a flow of liquid through a bed of the resin. Resins are in general very fragile after swelling in an organic solvent so non-abrasive stirring is necessary. Thus, shaking at moderate speed (320 rpm) in a shaker is useful, especially on a small scale. Gentle mechanical stirring with a blunt stirring blade is also useful, especially for larger scale. Agitation by nitrogen bubbling may also be used.

In one embodiment, the phenolic compound has a $M_w \geq 750$ g/mol, preferably a $M_w \geq 1,000$ g/mol.

The phenolic compound may have a $M_w \leq 5,000$ g/mol.

The phenolic compound may have a $M_w \leq 4,000$ g/mol.

The phenolic compound may have a $M_w \leq 3,000$ g/mol.

According to one embodiment, said phenolic compound has a $M_w \leq 2,000$ g/mol.

The cross-linked resin may be a cross-linked polymer resin.

The cross-linked polymer resin may be any polymer compatible with the desired solvent, such as polystyrene resin, polyamide resin or an acrylamide-Peg copolymer.

In the functionality of —C(=O)—CHXCH$_2$R, R is preferably a branched or unbranched alkyl having 1 to 8 carbon atoms, such as e.g. methyl or ethyl. Even more preferably, R is methyl.

According to one embodiment, the functionality of —C(=O)—CHXCH$_2$R is a α-haloketo group.

Preferably, in the α-haloketo group, X is Br or Cl. Even more preferably, X is Br.

Preferably, in the α-haloketo group, R is a branched or unbranched alkyl having 1 to 8 carbon atoms, such as e.g. methyl or ethyl. Even more preferably, R is methyl.

The α-haloketo group may be a α-bromo-ketone, such as

Preferably, the α-haloketo group is

According to one embodiment, said cross-linked resin is a cross-linked polymer resin, comprising the functionality of This resin is also referred to as Brominated Wang.

The base may be soluble in the solvent.

The base may be insoluble in the solvent.

The base may be the corresponding base of the solvent.

According to another embodiment, said base is chosen from the group consisting of alkali metal hydrides, alkaline earth metal hydrides, sterically hindered alkoxides, strong amidine bases, amide bases and phosphazene bases.

The alkali metal hydride may be sodium hydride, lithium hydride, and potassium hydride.

The alkaline earth metal hydride may be calcium hydride.

The sterically hindered alkoxide may be t-butoxide.

The strong amidine base may be tetramethyl guanidine, DBU or DBN.

The amide base may be LDA, LiTMP, LiHMDS or KHMDS.

The phosphazene base may be tert-butylimino-tris(dimethylamino)phosphorene.

The very non-nucleophilic bases such as the phosphazene bases may be used directly in the presence of the resins.

Nucleophilic bases such as NaOEt, NaOMe, or NaOiPr can be used if the net effect of a nucleophilic displacement on the electrophilic functional group in a compound, such as an ethoxysilane, in a mixture comprising phenolic compounds is zero, e.g. an ethoxide is displaced by an ethoxide or a methoxide is displaced by a methoxide.

Specifically, said base is chosen from the group consisting of a sterically hindered alkoxide, NaOEt, NaOMe, NaOiPr, NaH, LiH, KH, and CaH$_2$.

The sterically hindered alkoxide may be as t-butoxy or another sterically hindered alkoxide with up to 8 carbon atoms.

The alkoxy base may be NaOEt, NaOMe, or NaOiPr.

Preferably, the base is chosen from NaOEt or NaH.

The base may be present in an amount of 1-10 equivalents, or 1-7 equivalents, or 1-3 equivalents, or 1-1.2 equivalents in relation to the amount of phenol compounds.

The —C(=O)—CHXCH$_2$R group may be present in an amount of 1-10 equivalents, or 1-7 equivalents, or 1-3 equivalents, or 1-1.2 equivalents in relation to the amount of phenol compounds relative to the amount of phenol compounds.

In one specific embodiment, the linker is and the base is NaOEt.

In another specific embodiment, the linker is and the base is NaH.

According to another embodiment, said step of contacting is performed in the presence of the base and a solvent.

According to yet another embodiment, said solvent is selected from the group consisting of THF, MTBE, dioxane, cyclopentylmethyl ether, dibutylether, toluene, dichloromethane, DMF, NMP, and MeCN.

The solvent may be a mixture of two or more solvents.

The solvent may be THF, toluene, dichloromethane or MTBE.

The solvent may be THF or toluene.

In one specific embodiment, the α-haloketo group is the base is NaOEt and the solvent is toluene.

In another specific embodiment, the α-haloketo group is the base is NaH and the solvent is toluene.

In one specific embodiment, the α-haloketo group is the base is NaOEt and the solvent is THF.

In another specific embodiment, the α-haloketo group is the base is NaH and the solvent is THF.

In another specific embodiment, the α-haloketo group is the base is NaOEt and the solvent is MTBE.

According to one embodiment, said cross-linked resin has a swelling factor of 1-5.5 in the given solvent. A high swelling factor gives the phenolic compound a better access the (=O)—CHXCH$_2$R group and thus a shorter time is needed for the immobilization.

The solvent may be suitable for large scale solid phase synthesis. Examples of such a solvent are THF, MTBE, dioxane, cyclopentylmethyl ether, dibutylether, toluene, dichloromethane, DMF, NMP, and MeCN.

The resin bead size may be 100-400 mesh, such as 100-200 mesh or 200-400 mesh, such as 170 mesh, such as 120 mesh. Preferably, the bead size is 100-200 mesh or 200-400 mesh.

Before the resin is used for the first time, it may be washed to remove compounds with potential toxicity. The step of washing the resin has to be performed without deactivating or physically destroying the resin. Resins are in general very fragile after swelling in an organic solvent so non-abrasive stirring is necessary. This can be achieved as described above. Shaking at moderate speed (320 rpm) in a shaker is useful on a small scale. For larger scale, gentle mechanical stirring with a blunt stirring blade is useful. Agitation by nitrogen bubbling may also be useful.

The solvent used for the washing of the resin may be chosen from the group consisting of THF, toluene, dibutyl ether, cyclopentyl methyl ether, dioxane, DMF, NMP, DCM, MeCN. Such a solvent does not degrade the resin appreciably. A specific example of a solvent suitable for washing of the resin is an ether such as methoxy t-butyl ether.

Efficient washing of the resin may be achieved by soaking it repeatedly in batches of fresh solvent or, more efficiently, by subjecting it to continuous extraction in a Soxhlet setup.

Thus, in one embodiment of the invention, the resin is subjected to Soxhlet extraction prior to use.

Eluation of the scavenged phenolic compounds may be achieved by photolysis, preferably at 350 nm.

According to a second aspect, there is provided the use of a method according to the present disclosure for removing a phenolic compound having a Mw≥500 g/mol from a mixture.

According to a third aspect, there is provided a method of removing phenolic compounds having a Mw≥500 g/mol from a composition comprising compounds having at least one alkoxysilane group, wherein the alkoxysilane group is —SiR$^1$R$^2$R$^3$; and wherein R$^1$ is —O(CH$_2$)$_x$—CH$_3$, wherein x=0 to 7; R$^2$ is the same as R$^1$ or OH; R$^3$ is the same as R$^1$ or OH; wherein the method comprises the steps of ionizing the phenolic compound by subjecting it to a base; and contacting, under agitation, the ionized phenolic compound with a cross-linked resin comprising the functionality of —C(=O)—CHXCH$_2$R, wherein X is chosen from the group consisting of Br, Cl, I, CN, OMs, OTs, or OTf, and R is H, CH3 or an branched or unbranched alkyl having 1 to 8 carbon atoms. The nature of the resin and base may be as described above.

The resin may comprise α-haloketo groups as described above.

The step of contacting may be performed in the presence of the base and a solvent. The nature of the base and solvent may be as described above.

The base may be an alkoxy base.

According to one embodiment, the base is CH$_3$—(CH$_2$)$_y$—O—Y; wherein y=0 to 7, wherein y=x; and Y is Na, K, Li.

In one embodiment, x is 1, i.e. R$^1$ is —O—CH$_2$—CH$_3$, R$^2$ is the same as R$^1$ or OH and R$^3$ is the same as R$^1$ or OH.

An additional advantage of using the method above for removing phenolic compounds from a mixture comprising compounds having at least one alkoxysilane group is that silane hydrolysis products, presumably formed from moisture exposure during the workup of the preceding hydrosilylation reaction, and which impact the purity of the final product, are removed as well, yielding a considerably purer product. This is an advantage when producing a material for pharmaceutical use.

According to a fourth aspect, there is provided the use of a method according to the present disclosure for removing a phenolic compound having a Mw≥500 g/mol from a composition comprising compounds having at least one alkoxysilane group.

According to a fifth aspect, there is provided a product, from which at least one phenolic compound having a Mw≥500 g/mol has been removed by a method according to the present disclosure.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [solvent, base, step, etc.]" are to be interpreted openly as referring to at least one instance of said solvent, base, step, etc., unless explicitly stated otherwise. The steps of any method disclosed herein do not have to be performed in the exact order disclosed, unless explicitly stated.

As used herein, the term "comprising" and variations of this term are not intended to exclude other additives, components, integers or steps.

Definitions and Abbreviations

As used herein, the term "alkoxy" refers to the formula —OR wherein R is a C$_{1-8}$ alkyl, e.g. methoxy, ethoxy, n-propoxy, 1-methylethoxy (isopropoxy), n-butoxy, iso-butoxy, sec-butoxy, tert-butoxy, amyloxy, iso-amyloxy and the like. An alkoxy group in accordance with the present invention may be optionally substituted.

As used herein, the term "gel" means a cross-linked polymer where the covalent network extends through the whole object. Network polymer is a synonym for gel.

As used herein, the term "lower alkyl" refers to an alkyl having 1-8 carbon atoms. Phenol (or phenolic compound) is a trivial name for hydroxybenzene or, in a broader sense, any compound containing a hydroxysubstituted aromatic ring.

As used herein the term "molecular weight" refers to the molecular weight of a compound having a specific molecular structure or to the weight average molecular weight, also referred to as mass average molar mass or weight average molar mass, of a compound comprising a polymeric moiety wherein the number of monomers in the polymeric moiety vary between different individual molecules. Thus, the molecular weight of a phenolic compound having a specific molecular structure is the molecular weight as calculated based on the number and nature of the atoms of the phenolic compound or as measured by e.g. mass spectrometry. The molecular weight of a phenolic compound comprising a polymeric moiety refers to the weight average molecular weight, also referred to as mass average molar mass or weight average molar mass, which may be determined by e.g. gel filtration or size-exclusion chromatography (SEC). More specifically, the weight average molecular weight may be determined in accordance with ISO 16014-1:2019 and ISO 16014-5:2019 ("Determination of average molecular weight and molecular weight distribution of polymers using size-exclusion chromatography") or may be determined in accordance with ISO 16014-1:2019 in combination with any of ISO 16014-2:2019 to ISO 16014-4:2019. Alternatively, the weight average molecular weight may be determined by SEC and verified using liquid chromatography-mass spectrometry (LC-MS) or high-performance liquid chromatography (HPLC). Preferably, the HPLC method is as described herein.

As used herein, the term "resin" is defined as insoluble organic material.

Brominated Wang resin: brominated α-methylphenylacyl polystyrene resin.

DBU is an acronym for diazabicycloundecene (1,8-Diazabicyclo[5.4.0]undec-7-ene).

DCM is an acronym for dichloromethane.

DMF is an acronym for dimethylformamide.

DVB is an acronym for divinylbenzene.

EtOH is an acronym for ethanol.

Karstedt's catalyst is an organoplatinum catalyst derived from divinyl containing disiloxane and is widely used in hydrosilylation catalysis (U.S. Pat. No. 3,775,452).

KHMDS is an acronym for potassium hexamethyldisilazide.

LDA is an acronym for lithium diisopropylamide.

LiHMDS is an acronym for lithium hexamethyldisilazide.

LiTMP is an acronym for lithium 2,2,6,6-tetramethylpiperidine.

Functionality: anchors the reactive substrate, e.g. a phenol, to the polymeric support.

MeCN is an acronym for acetonitrile.

MeOH is an acronym for methanol.

MTBE is an acronym for methyl tert-butyl ether.

NMP is an acronym for 1-methyl-2-pyrrolidinone.

OMs is an acronym for methylsulfonato-oxy.

OTs is an acronym for para-toluenesulfonato-oxy.

OTf is an acronym for trifluoromethylsulfonato-oxy.

Pegylation: alkylation with polymeric ethylene oxide.

PEG is an acronym for poly ethylene glycol.

PPOA is an acronym for (4-propionylphenoxy)acetic acid.

Scavenging: removal of undesired impurities from a reaction mixture.

THF is an acronym for tetrahydrofuran.

"% a/a" is calculated as the area of a peak representing a specific compound divided by the total area of all peaks in a chromatogram. In this disclosure, the chromatograms were obtained at a wavelength of 220 nm.

BRIEF DESCRIPTION OF THE FIGURES

Further objects, features and advantages will appear from the following detailed description, with reference being made to the accompanying drawings, in which.

DETAILED DESCRIPTION

WO2018/130713A1 discloses a number of compounds for the use in coating nanomaterials for use as pharmaceutical products. One example of such a coating material is the compound 1. 1 is produced from methoxy PEG, which has a distribution of molecular weights around an average of 750 g/mol. The most common degree of polymerization is 16 and analogues with polymerization degrees from 9-25 can be detected in 1. Thus, in this disclosure, compound 1 is interpreted as having 9-25 ($-CH_2-CH_2-O-$)-units, such as 10-22, such as 12-20, such as 14-18, such as 15-17. The same applies to compounds 2, 3, 4, 5, 6, 7 and 13. The molecular weights for these compounds (1, 2, 3, 4, 5, 6, 7 and 13) containing a polymeric moiety, i.e. the PEG-moiety, are the weight average molecular weights, also referred to as mass average molar mass or weight average molar mass.

Figure 1:
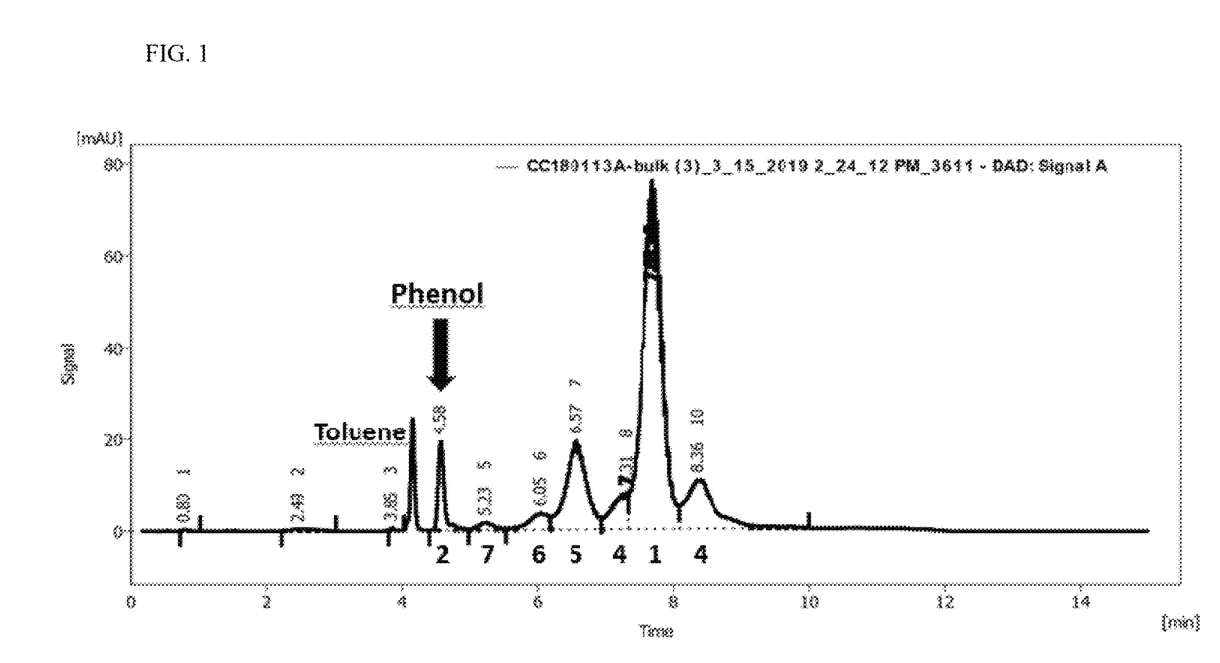
FIG. 1 shows a chromatogram (Scheme 1, HPLC method 1) of the impurity profile of a crude material comprising compound 1 and the phenol 2. The numbers under the peaks correspond to the numbers in Schemes 1 to 4.

When producing the coating material 1 (scheme 1, Mw=1267.7 g/mol) on a large scale, a brown coloration of the product is sometimes encountered. The brown coloration can be traced to the presence of a phenolic impurity (2) which is found in the product, sometimes in rather large amounts. In the chromatogram of FIG. 1, the impurity profile of a crude material with structural assignments is shown. The hydrosilylation reaction in the presence of a platinum catalyst such as Karstedt's catalyst, always gives a mixture of the desired hydrosilylation and reduction to the alkane. In cases where the double bond can migrate that is usually also encountered to some degree (J. Polym. Sci., Part A: Polym. Chem., 2018, 56, 527-536). In the present case, the double bond migration gives rise to a vinyl ether (3, Scheme 1), which is sensitive to hydrolysis, and later liberates a phenol, which will in turn give rise to a dark brown coloration of the product. This is undesirable for a pharmacological product. It is well known that phenols can form dark, high molecular weight polymers under oxidizing condition, a reaction called phenol coupling (e.g. J. Org. Chem., 1973, (5) 97-134, J. Org. Chem., 2019, 84(4), 1677-1686). The sensitive nature of 1 precludes the use of standard purification methods such as extraction or reverse-phase chromatography, which proceed under hydrolytic conditions. Straight phase silica chromatography is also unsuitable since the ethoxysilyl groups of 1 react with the surface silanols of silica. Furthermore, the high molecular weight makes distillation, even under reduced pressure, impossible and, for mixtures comprising compounds having a polymeric moiety, the spread of molecular weights precludes the use of fractional crystallization for purification.

Scheme 1. Hydrosilylation of 13, phenol functionality in 2 encircled. R refers to a protection group e.g. a siloxane. "Nuc" refers to a nucleophile e.g ethoxide.

A large number of reactive resins are available for the large and expanding field of solid-phase peptide synthesis. However, compound 2 has a molecular weight of 1063.4 g/mol, which is already large enough to prevent or substantially slow down diffusion in network polymers (gels/resins). The general opinion in the literature is that compounds with a molecular weight above 500 g/mol start to become difficult to immobilize on resins. Despite this generally accepted preconception, we performed an initial screen of commercially available resins (Table 1). This initial screen (Table 2) of commercially available resins indicated that some of them could potentially be useful for immobilizing phenolic compounds having a $M_w \geq 500$ g/mol and/or for removing phenolic compounds having a $M_w \geq 500$ g/mol from a composition comprising compounds having at least one alkoxysilane group.

TABLE 1

Resins and bases used. DVB is divinylbenzene.

| Resin | Structure | Solid support | Cross-linking | Loading (mmol/g) | Reactive functionality |
|---|---|---|---|---|---|
| Merrifield's peptide resin | | Polystyrene 200-400 mesh | 2% DVB | 1-1.5 | Bensylic chloride |
| Sulfonyl-chloride resin | | Polystyrene 100-200 mesh | 1% DVB | 1.5-2.0 | Sulfonyl chloride |
| Wang bromide | | Polystyrene 100-200 mesh | 1% DVB | 0.5-1.0 | Bensylic bromide |
| Tentagel R Br | | Polystyrene Peg spacer ~3000 Da 90 μm | Not specified | 0.18-0.22 | Primary alkyl bromide |

TABLE 1-continued

Resins and bases used. DVB is divinylbenzene.

| Resin | Structure | Solid support | Cross-linking | Loading (mmol/g) | Reactive functionality |
|---|---|---|---|---|---|
| Tentagel S Br | | Polystyrene Peg spacer ~3000 Da 130 μm | Not specified | 0.2-0.30 | Primary alkyl bromide |
| Polystyrene A Br | | Polystyrene 500-560 μm | 1% DVB | 0.8-1.2 | Primary alkyl bromide |
| Brominated PPOA | | Polystyrene 100-200 mesh | Not specified | 0.5-1 | Secondary α-bromo ketone |
| Brominated Wang | | Polystyrene 100-200 mesh | 1% DVB | 1.1 | Secondary α-bromo ketone |
| 4-(Dimethyl-amino)-pyridine, polymer-bound | | Polystyrene 200-400 mesh | 2% DVB | ~6.0 | Base |

TABLE 1-continued

Resins and bases used. DVB is divinylbenzene.

| Resin | Structure | Solid support | Cross-linking | Loading (mmol/g) | Reactive functionality |
|---|---|---|---|---|---|
| 1.5.7-Triaza-biocyclo-[4.4.0]dec-5-ene-poly-styrene | | Poly-styrene 200-400 mesh | 2% DVB | 2.6 | Base |

The initial amount of phenolic compounds in the mixture was 5.4% a/a (220 nm) and the ratio (% a/a (220 nm):% a/a (220 nm)) between compounds 1 and 5 was 3.66. It was found that when agitating the crude 1 mixture (FIG. 1) in a solvent in the presence of a base the amount of phenol 2 was increased to 17% a/a (220 nm) (FIG. 2) via the hydrolysis of the hidden phenols 4 (FIG. 1). "% a/a" is calculated as the area of the peak representing the specific compound divided by the total area of all peaks in the chromatogram. In this case, the chromatogram was obtained at a wavelength of 220 nm.

We found that the resins Merrifields peptide resin (experiment 1, Table 2), Wang bromide (experiment 3, Table 2), Tentagel R Br (experiment 4, Table 2), Tentagel S Br (experiment 5, Table 2) and sulfonyl chloride resin (experiment 2, Table 2) reduced the concentration of phenol 2 but also led to substantial degradation of 1 as indicated by a lowering of the 1/5 ratio (Table 2). The degradation of 1 indicates that the resin used is unsuitable as a phenol scavenger resin in hydrolysis sensitive reaction mixtures.

The experiments revealed that brominated PPOA (brominated [4-propionylphenoxy]-acetic acid) resin (experiment 6, Table 2) and brominated Wang (experiment 7, Table 2) may be used for immobilizing phenolic compounds having a molecular weight of ≥500 g/mol, since the ratio between between compounds 1 and 5 at the end of the experiment was above 2.0.

The functionality in brominated PPOA resin and brominated Wang share the same electrophilic functionality (methyl substituted α-bromo ketone, Table 1) but differ in the attachment of the linker to the polymeric support (C—C vs. amide/ether linkage). The secondary amide functionality is susceptible for a deprotonation/nucleophilic attack and the ether linkage alters the electron density on the α-bromo ketone. Surprisingly, brominated Wang resin (experiment 7, Table 2) removed phenol 2 from the dipod mixture in just two hours without any degradation of 1 while brominated PPOA (experiment 6, Table 2) reduced the total concentration of phenol 2 but also led to substantial degradation of 1. Surprisingly, the results above show that the resin sold under the name brominated Wang with the structure shown in Table 1 may be used in the scavenging of phenols with a $M_w \geq 500$ in a reaction mixture consisting of hydrolysis sensitive substrates. Thus, this resin was chosen for further evaluation (Table 3).

TABLE 2

Resins for the immobilization of phenol 2. The experiments were performed on the same batch of crude material comprising 1 and phenolic compounds. The solvent was THF. The experiments were performed at room temperature (RT). Results in columns F-I are reported after the time indicated in column E (Time 2). The amount of resin and base is expressed as % a/a (220 nm) in relation to phenol 2 (Scheme 1). The phenol content (expressed as % a/a (220 nm) of the total mixture) after removal of phenols is shown. Left and right shoulders correspond to 4 (FIG. 1). The ratio (% a/a (220 nm):% a/a (220 nm)) between compound 1 and 5 is also shown.

| A) Experiment | B) Resin eq | C) Base eq | D) Time 1 minutes | E) Time 2 | F) Phenol (% a/a (220 nm)) | G) Left shoulder (% a/a (220 nm)) | H) Right shoulder (% a/a (220 nm)) | I) 1/5 ratio |
|---|---|---|---|---|---|---|---|---|
| Reference (starting material) | — | — | — | — | 5.4 | 4.4 | 12.4 | 3.66 |
| 1 | Merrifield 7.6 | NaH 5.9 | 60 | over night | 8 | 3.3 | 5.6 | 1.68 |
| 2 | Sulfonyl-chloride resin 7.6 | NaH 5.9 | 60 | over night | 0 | 2.6 | 8.9 | 1.97 |
| 3 | Wang bromide 7.6 | NaH 5.9 | 60 | over night | 0 | ~0 | 13.8 | 1.89 |
| 4 | Tentagel R Br 2.3 | NaH 1.8 | 80 | over 3 nights | 0.5 | 3.6 | 6.4 | 1.84 |

TABLE 2-continued

Resins for the immobilization of phenol 2. The experiments were performed on the same batch of crude material comprising 1 and phenolic compounds. The solvent was THF. The experiments were performed at room temperature (RT). Results in columns F-I are reported after the time indicated in column E (Time 2). The amount of resin and base is expressed as % a/a (220 nm) in relation to phenol 2 (Scheme 1). The phenol content (expressed as % a/a (220 nm) of the total mixture) after removal of phenols is shown. Left and right shoulders correspond to 4 (FIG. 1). The ratio (% a/a (220 nm):% a/a (220 nm)) between compound 1 and 5 is also shown.

| A) Experiment | B) Resin eq | C) Base eq | D) Time 1 minutes | E) Time 2 | F) Phenol (% a/a (220 nm)) | G) Left shoulder (% a/a (220 nm)) | H) Right shoulder (% a/a (220 nm)) | I) 1/5 ratio |
|---|---|---|---|---|---|---|---|---|
| 5 | Tentagel S Br 2.3 | NaH 1.8 | 85 | over 2 nights | 5.7 | 2.8 | 3.6 | 1.83 |
| 6 | Brominated PPOA 7.6 | NaH 5.9 | 60 | over night | 5.4 | 2.8 | 5.4 | 2.31 |
| 7 | Brominated Wang 7.6 | NaH 5.9 | 0 | 2 h | 0.3 | ~0 | 3.1 | 3.65 |

In particular, the immobilization of phenols with molecular weights above 500 g/mol is relevant for the current invention. If the molecular weight is 5,000 g/mol or more the reaction times become prohibitively long (Example 5 below) and falls outside the scope of the current invention. For molecular weights between and including 500 g/mol and 2,000 g/mol the current method is particularly useful.

Two other high molecular weight phenols were synthesized and investigated (compounds 10 and 12 of schemes 2 and 3, respectively).

Scheme 2. Synthesis of phenol 10

10

Scheme 3. Synthesis of phenol 12

The result was that phenol 10, having a molecular weight (weight average molecular weight, also referred to as mass average molar mass or weight average molar mass) of about 2,000 g/mol (2 kDa), was immobilized and removed from the solution in less than 24 hours (Example 1c below), which is considered useful whereas phenol 12, having a molecular weight (weight average molecular weight, also referred to as mass average molar mass or weight average molar mass) of about 5,000 g/mol (5 kDa) was unaffected after a week (sodium ethoxide (NaOEt) and brominated Wang in THF at room temperature). Thus the current method is useful for the immobilization and removal of phenols with a molecular weight of less than 5,000 g/mol (5 kDa).

Since the ethoxy groups in compound 1 are sensitive to nucleophilic attack by the base used in the method according to the present disclosure, the choice of base used is important. The relevant resins are all reactive towards nucleophiles and most bases are nucleophilic too. This gives rise to two issues: I, the possibility of degradation of the activated resin by direct reaction with the base and II, degradation of compounds 1 and/or 5 by reaction with a nucleophile, the alkoxy silane being the most sensitive group. To avoid the first issue, it is important to use a strong enough base so essentially all the phenol can be deprotonated by contacting it with the base in a first step prior to the addition of the reactive resin.

Scheme 4. Exchange of the silane ethoxy groups in 1 using sodium ehoxide yielding no net effect.

The best choice for the current case (when the composition comprises ethoxy-silanes) turned out to be using sodium ethoxide which has a number of advantages. I, it is cheap and available in high quality, II, it can react with the silane but the net effect is zero since it is only an exchange of identical groups (Scheme 4), III, it is strong enough to essentially deprotonate the phenol completely so the resin can be added afterwards so the risk of resin degradation is minimized.

Although the most practical base for the purification of 1 from phenol 2 on a large scale was sodium ethoxide (Table 3) many other bases are also suitable. Bases such as the alkali metal hydrides such as sodium hydride, lithium hydride, and potassium hydride are useful. It is also conceivable to use the alkaline earth metal hydrides such as calcium hydride. Sterically hindered alkoxides such as t-butoxide is also conceivable. Strong amidine bases such as tetramethyl guanidine, DBU or DBN, amide bases such as LDA, LiHMDS or KHMDS, phosphazene bases such as tert-butylimino-tris(dimethylamino)phosphorane may also be useful. It is conceivable to use the very non-nucleophilic bases such as the phosphazene bases directly in the presence of the resins.

TABLE 3

Figure 2:
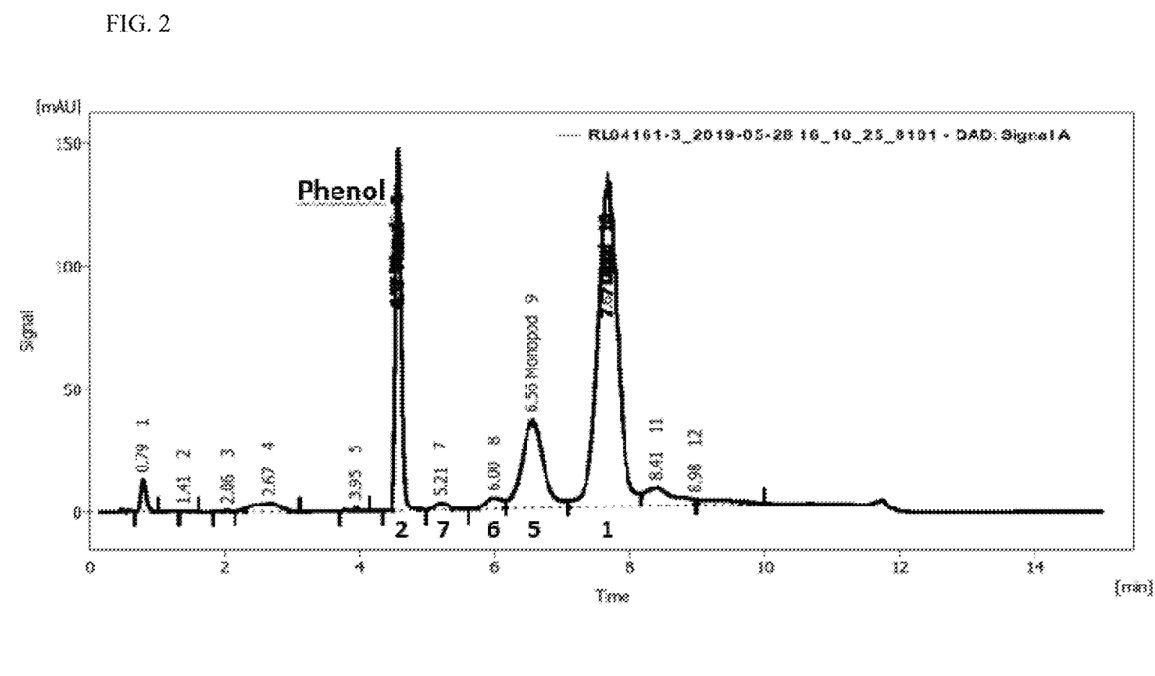
FIG. 2 shows a chromatogram (HPLC method 1) of the material from FIG. 1 when all hidden phenol (4) has been liberated by the nucleophilic attack from ethoxide (i.e. converted to phenol 2) in the course of a method according to the present disclosure. The numbers under the peaks correspond to the numbers in Schemes 1 to 4 below.

Investigation of the effect of phenol dilution, solvent, base, number of equivalents of base, number of equivalents of resin and reaction time. The experiments were performed on the same batch of crude material comprising 1 and phenolic compounds. Results in columns H-K are reported after the time indicated in column 6 (time 2). The amount of resin (Brominated Wang) and base is expressed as molecular equivalents in relation to phenol 2. The phenol content (expressed as % a/a (220 nm) of the total mixture) after removal of phenols is shown. Left and right shoulders correspond to hidden phenol 4 (FIG. 2). The ratio (% a/a (220 nm):% a/a (220 nm)) between compound 1 and 5 is also shown.

| A) Experiment | B) Brominated Wang (eq) | C) Base (eq) | D) Phenol dilution (mM) | E) Solvent | F) Time 1 (min) | G) Time 2 | H) Phenol (% a/a (220 nm)) | I) Left shoulder (% a/a (220 nm)) | J) Right shoulder (% a/a (220 nm)) | K) Ratio 1/5 |
|---|---|---|---|---|---|---|---|---|---|---|
| 7 | 7.6 | NaH 5.9 | 12 | THF | 0 | 2 h | 0.3 | ~0 | 3.1 | 3.65 |
| 8 | 2.3 | Dimethyl-amino-methyl-poly-styrene 1.8 | 24 | MTBE | 0 | over 2 nights | 5.5 | 4.9 | 13.5 | 3.55 |
| 9 | 2.3 | 1.5.7-Triaza-bicyclo-[4.4.0]dec-5-ene-poly-styrene 1.8 | 24 | MTBE | 70 | over night | 4 | 5.6 | 8.8 | 2.31 |

TABLE 3-continued

Investigation of the effect of phenol dilution, solvent, base, number of equivalents of base, number of equivalents of resin and reaction time. The experiments were performed on the same batch of crude material comprising 1 and phenolic compounds. Results in columns H-K are reported after the time indicated in column 6 (time 2). The amount of resin (Brominated Wang) and base is expressed as molecular equivalents in relation to phenol 2. The phenol content (expressed as % a/a (220 nm) of the total mixture) after removal of phenols is shown. Left and right shoulders correspond to hidden phenol 4 (FIG. 2). The ratio (% a/a (220 nm):% a/a (220 nm)) between compound 1 and 5 is also shown.

| A) Experiment | B) Brominated Wang (eq) | C) Base (eq) | D) Phenol dilution (mM) | E) Solvent | F) Time 1 (min) | G) Time 2 | H) Phenol (% a/a (220 nm)) | I) Left shoulder (% a/a (220 nm)) | J) Right shoulder (% a/a (220 nm)) | K) Ratio 1/5 |
|---|---|---|---|---|---|---|---|---|---|---|
| 10 | 11.8 | Pyridine 17.6 | 8 | THF | 0 | over night | 5.4 | 4.5 | 11.4 | 3.82 |
| 11 | 7.6 | NaH 5.9 | 12 | THF | 0 | 65 min | 0 | ~0 | 3.6 | 3.36 |
| 12 | 3.1 | NaH 2.4 | 24 | THF | 0 | 5 h 20 min | 0 | ~0 | 2.8 | 3.79 |
| 13 | 1.5 | NaH 1.2 | 48 | THF | 0 | over night | 2.7 | ~0 | 5.3 | 3.79 |
| 14 | 3.1 | NaOEt 2.4 | 24 | THF | 0 | over night | 0 | ~0 | 4.3 | 3.63 |
| 15 | 3.1 | NaOEt 2.4 | 24 | THF | 85 | over night | 0.8 | ~0 | 3.7 | 3.83 |
| 16 | 3.1 | NaOEt 2.4 | 24 | Toluene | 60 | over night | 0 | ~0 | 2.7 | 3.91 |
| 17 | 2.3 | NaOEt 1.8 | 24 | THF | 90 | over night | 0 | ~0 | 4.6 | 3.45 |
| 18 | 2.3 | NaOEt 1.8 | 24 | Toluene | 70 | 28 h | 1.7 | ~0 | 3.1 | 3.79 |
| 19 | 1.5 | NaOEt 1.2 | 36 | Toluene | 70 | over 2 nights | 6.6 | ~0 | 5.6 | 3.69 |
| 20 | 2.3 | NaOEt 1.9 | 24 | MTBE | 70 | over night | 0.1 | ~0 | 3 | 3.88 |
| 21 | 1.8 | NaOEt 1.4 | 24 | MTBE | 70 | over night | 1.3 | ~0 | 3.3 | 3.87 |
| 22 | 2.3 | NaOEt 1.8 | 24 | CH2Cl2 | 70 | over night | 0 | N/A | N/A | 3.25 |
| 23 | 2.1 | NaOEt 1.6 | 24 | MTBE | 65 | over night | 1 | ~0 | 1.8 | 3.66 |

It was found that the base may be present in an amount as low as 1.2 (experiment 13) and as high as 5.9 (experiment 7) equivalents in relation to the amount of phenol compounds.

It was also found that the functionality of the resin, i.e.

can be present in an amount as low as 1.5 (experiment 13) and as high as 7.6 (experiment 7) equivalents in relation to the amount of phenol compounds relative to the amount of phenol compounds.

The pKa values of phenols typically range from 8 to 11 (in water) so to deprotonate a phenol to 99% or more, a difference of two or more pKa units is suitable for a given phenol. For example, 1,3,5-trihydroxy benzene has a pKa value of 8.45 so a suitable base in this case would have pKa value of 10.45 or higher. Although pKa values are different in different solvents, this simple rule should be useful for the selection of base for one skilled in the art.

We also discovered that during the purification of the reaction mixture shown in FIG. 1, more phenol was liberated gradually from some of the products identified as dimers or trimers by mass spectroscopy. Presumably the phenols are masked by silylgroups and are gradually released by nucleophilic attack from a nucleophile e.g. ethoxide. If sodium ethoxide is added to the reaction mixture and then left stirring for some time, such as 1, 2, 6, 12, 24, 48 h, the masked phenol impurity is liberated and amenable to removal by the resin (FIG. 2). This is seen in FIG. 2 as an increase of the peak designated 2 (the phenol) and a decrease of the peaks designated 4 (the masked phenol) compared to the corresponding peaks in FIG. 1.

Figure 3:
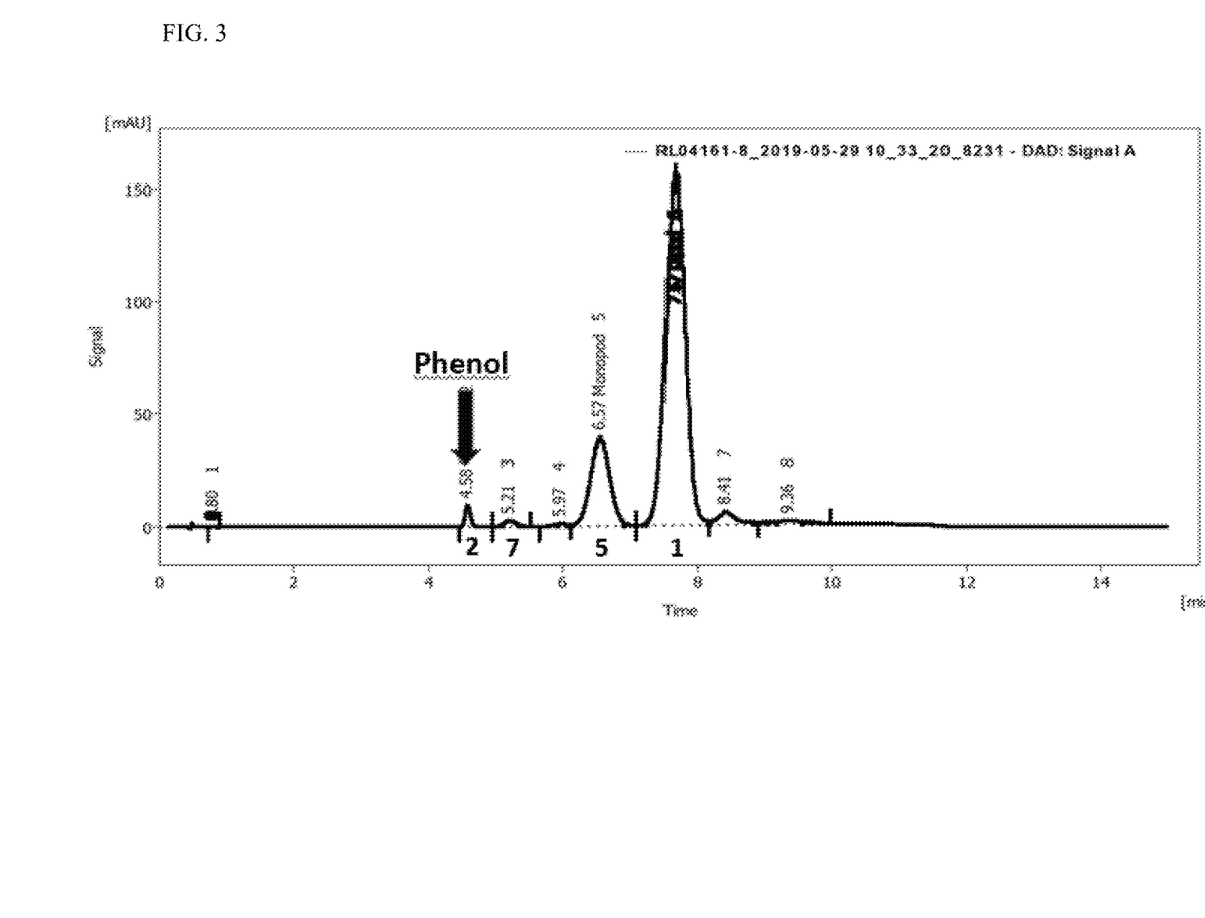
FIG. 3 shows a chromatogram (HPLC method 1) of the material from FIG. 1 after phenols present in the material have been removed according to the present disclosure. The numbers under the peaks correspond to the numbers in Schemes 1 to 4 below.

In Example 4 below it is shown how the initial phenol concentration is 5% and after liberation of the masked phenol fraction by sodium ethoxide, it goes up to 17%. After treatment with the Brominated Wang resin, the phenol content was down to 1% (FIG. 3). This is seen in FIG. 3 as a decrease of the peak designated 2 (the phenol) compared to the corresponding peaks in FIGS. 1 and 2.

To utilize a resin to purify a compound for clinical use, it has to be carefully washed to remove compounds with potential toxicity without deactivating or physically destroying it. Resins are in general very fragile after swelling in an organic solvent so non-abrasive stirring is necessary. This can be achieved in a multitude of ways. We found shaking at moderate speed (320 rpm) in a shaker to be useful on a small scale. For larger scale, gentle mechanical stirring with a blunt stirring blade is useful. Agitation by nitrogen bubbling can also be useful. The optimal solvent for the washing was found to be ethers such as methoxy t-butyl ether which was effective but didn't degrade the resin appreciably. Efficient washing of the resin can be achieved by soaking it repeatedly with batches of fresh solvent (Example 5) or, more efficiently, by subjecting it to continuous extraction in a Soxhlet setup (Example 4). Other solvents suitable for washing of the resin are toluene, dibutyl ether, cyclopentyl methyl ether, dioxane, DMF, DCM, MeCN.

LIST OF EMBODIMENTS

In one embodiment of the current invention the Brominated Wang resin, comprising the functionality of is used to immobilize phenol 2 in a reaction mixture containing compound 1.

In one embodiment of the current invention the Brominated Wang resin is used to immobilize phenol 2 in a reaction mixture containing compound 1, so that the concentration of 2 in the solution becomes less than 5% of the concentration of 1.

In one embodiment of the current invention the Brominated Wang resin is used to immobilize phenol 2 in a reaction mixture containing compound 1, so that the concentration of 2 in the solution becomes less than 2% of the concentration of 1.

In one embodiment of the current invention the Brominated Wang resin is used to immobilize phenol 2 in a reaction mixture containing compound 1, so that the concentration of 2 in the solution becomes less than 1% of the concentration of 1.

In one embodiment of the current invention the Brominated Wang resin is used to immobilize phenol 2 in a reaction mixture containing compound 1, so that the concentration of 2 in the solution is less than 0.1% of the concentration of 1.

In one embodiment of the current invention the Brominated Wang resin is used to immobilize and/or remove a phenol of molecular weight 2,000 g/mol (2 kDa) from a solution to a degree of 90%, or 99%, or close to 100%.

In one embodiment of the current invention the Brominated Wang resin is used to immobilize and/or remove a phenol of molecular weight between 500 g/mol (0.5 kDa) and 4,000 g/mol (4 kDa) from a solution and then further modifying it by chemical reactions while bound to the resin and finally releasing the product from the resin by a chemical reaction such as a photochemical reaction.

In one embodiment of the current invention, a soluble, strong base is used to deprotonate a phenol with a molecular weight between 500 g/mol (0.5 kDa) and 4,000 g/mol (4 kDa), followed by contacting it with the Brominated Wang resin to immobilize phenol 2 in a reaction mixture or composition containing compound 1.

In one embodiment of the current invention, a soluble, strong base is used to deprotonate phenol 2 followed by contacting it with the Brominated Wang resin to immobilize phenol 2 in a reaction mixture or composition containing compound 1.

In one embodiment of the current invention, sodium ethoxide is used to deprotonate phenol 2 followed by contacting it with the Brominated Wang resin to immobilize phenol 2 in a reaction mixture or composition containing compound 1.

In one embodiment of the current invention, sodium hydride is used to deprotonate phenol 2 followed by contacting it with the Brominated Wang resin to immobilize phenol 2 in a reaction mixture or composition containing compound 1.

In one embodiment of the current invention the Brominated Wang resin was washed with methoxy t-butyl ether in a Soxhlet extractor for 48 h prior to use.

In one embodiment of the current invention the Brominated Wang resin was washed with several portions of methoxy t-butyl ether prior to use.

Experiments

General Information

Materials, reagents and solvents were obtained from commercial sources and were used without further purification unless otherwise noted. NMR spectra ($CDCl_3$) were recorded on a Varian Unity INOVA 400 MHz and chemical shifts are reported relative to the residual solvent peak of the deuterated solvent. HPLC was performed on a Hewlett Packard Series 1100 equipped with an Agilent Poroshell 120 EC-C18 4.6×50 mm column eluting at 1 ml/min with an oven temperature of 40° C., a DAD detector recording at 220 nm and an ELSD detector.

HPLC Methods

Method 1:

| Time (minutes) | Water (volume %) | Acetonitrile (volume %) |
|---|---|---|
| 0 | 60 | 40 |
| 1 | 60 | 40 |
| 7 | 5 | 95 |
| 11 | 5 | 95 |
| 15 | 60 | 40 |

Method 2:

| Time (minutes) | Water (volume %) | Acetonitrile (volume %) |
|---|---|---|
| 0 | 80 | 20 |
| 9 | 20 | 80 |
| 9.5 | 5 | 95 |
| 12 | 5 | 95 |
| 13 | 80 | 20 |
| 17 | 80 | 20 |

Example 1: Phenols with Higher Molecular Weight

Example 1a: Synthesis of 9 (Scheme 2)

mPeg2000OTs (1.64 g 0.75 mmol) was heated at 55° C. under vacuum overnight. To a solution of 8 (302 mg, 1.5 mmol) in THF (4 ml) at 0C.° was added NaH (44 mg, 1.6 mmol) and the mixture was stirred at 0° C. After 35 minutes the mixture was allowed to reach room temperature and the above mPeg2000-OTs dissolved in THF (2 ml) was added and the mixture was heated at 50° C. After 4 days the reaction was quenched by the addition of MeOH (2 ml) at room temperature. The mixture was stirred for 4 h after which the volatiles were evaporated. The crude material was taken up in $CHCl_3$ (100 ml), $MgSO_4$ (6.4 g) was added and the mixture was stirred at room temperature. After 2 h the solids were filtered off and the volatiles evaporated. The crude was dissolved in a minimum amount of $CH_2Cl_2$, precipitated by the slow addition of $Et_2O$ at 0° C., centrifuged (3200 rpm) for 10 minutes and decanted. The solids were washed with $Et_2O$, centrifuged and decanted, repeated three times. The product was dried under vacuum, yielding 9 (1.399 g, 0.65 mmol, 86%).

$^1$H-NMR (400 MHz, $CDCl_3$) δ=7.45-7.29; (m, 5H), 6.93-6.82; (m, 4H), 5.02; (s, 2H), 4.08; (t, J=4.6 Hz, 2H), 3.82; (t, 4.6 Hz, 3H), 3.65; (bs, 208H), 3.57-3.52; (m, 1H), 3.49-3.45; (m, 1H), 3.39; (s, 3H). NB! mPEG2000-OH as an impurity.

Example 1b: Synthesis of 10 (Scheme 2)

To the benzyl protected phenol 9 (1.399 g, 0.65 mmol) in THF (20 ml, $N_2$ bubbled for 5 minutes) was added 10% Pd/C (0.073 g). After 3 vacuum/$N_2$ cycles 3 vacuum/$H_2$ cycles were performed. The mixture was stirred under an atmosphere of $H_2$ (balloon) at room temperature. After 16 h 3 vac/$N_2$ cycles were performed, the solids were filtered off and the volatiles were evaporated. The crude was dissolved in a minimum amount of $CH_2Cl_2$, precipitated out by the slow addition of $Et_2O$, centrifuged (3200 rpm, 5° C.) for 10 minutes and decanted. The solids were washed with $Et_2O$, centrifuged and decanted ×2. The product was dried under vacuum yielding 10 (1.112 g, 0.53 mmol, 81%). HPLC/NMR analysis indicates that the product is contaminated by mPeg-OH.

$^1$H-NMR (400 MHz, $CDCl_3$) δ=6.83-6.73; (m, 4H), 6.08; (bs, 1H), 4.08; (t, J=4.6 Hz, 2H), 3.83; (t, 4.6 Hz, 3H), 3.65; (bs, 287H), 3.58-3.52; (m, 2H), 3.49-3.45; (m, 1H), 3.38; (s, 3H). NB! mPEG2000-OH as an impurity.

Example 1c: Loading of 10 on Brominated Wang Resin (Scheme 2)

The brominated Wang resin (0.663 g, 0.73 mmol) was swelled/washed in 4 ml MTBE for 3×20 minutes followed by 4 ml THF for 3×20 minutes. To phenol 10 (486 mg, 0.24 mmol) in THF (4 ml) was added NaOEt (41 mg, 0.56 mmol) and the mixture was agitated at room temperature under a blanket of $N_2$. After 1 h the above swelled/washed resin was added in one portion and the mixture was agitated in the dark under a blanket of $N_2$. The progress of the reaction was monitored by HPLC (method 2). After 22 h no 10 (in solution) could be detected by HPLC. After an additional day of agitation the resin was filtered off, washed 3×5 minutes with THF (5 ml) and the pooled fractions were evaporated yielding 0.1 g of a non UV active material (unreacted mPeg2000-OH).

Example 1d: Synthesis of 11 (Scheme 3)

mPeg5000OTs (5 g, 0.97 mmol) was dissolved in toluene (50 ml) and heated at reflux in a Dean-Stark setup. After 3 h the solution was cooled to room temperature and the volatiles were evaporated. To a solution of 8 (391 mg, 1.9 mmol) in THF (10 ml) at room temperature was added NaH (60 mg, 1 mmol) and the mixture was stirred at room temperature. After 35 minutes, the above mPeg5000OTs dissolved in THF (15 ml), was added and the mixture was heated at 50° C. After 7 days the reaction was quenched by the addition of MeOH (10 ml) at room temperature. The mixture was stirred for 4 h after which the volatiles were evaporated. The crude material was taken up in $CHCl_3$ (100 ml), $MgSO_4$ (6.5 g) was added and the mixture was stirred at room temperature. After 1 h 45 minutes the solids were filtered off and the volatiles evaporated. The crude was taken up in $CH_2Cl_2$ (100 ml), $MgSO_4$ (6.3 g) was added and the mixture was stirred at room temperature. After 3.5 h the solids were filtered off and the volatiles were evaporated. The crude was dissolved in a minimum amount of $CH_2Cl_2$, precipitated by the slow addition of $Et_2O$, centrifuged (3200 rpm) for 10 minutes and decanted. The solids were washed with $Et_2O$, centrifuged and decanted, repeated three times. The product was dried under vacuum yielding 11 (3.873 g, 0.74 mmol, 76%)

$^1$H-NMR (400 MHz, $CDCl_3$) δ=7.45-7.29; (m, 5H), 6.93-6.80; (m, 4H), 5.01; (s, 2H), 4.08; (t, J=4.6 Hz, 2H), 3.82; (m, 4H), 3.74-3.52; (bs, 513H), 3.49-3.44; (m, 2H), 3.39; (s, 3H). NB! mPEG5000-OH as an impurity.

Example 1e: Synthesis of 12 (Scheme 3)

To the benzyl protected phenol 11 (1.020 g, 0.19 mmol) in formic acid (10 ml) and dioxane (6 ml) was added 10% Pd/C (0.115 g). The mixture was heated at reflux. After 21.5 h the mixture was cooled to room temperature, filtered through double glass micro fibre filters and a pad of $MgSO_4$ and the volatiles were evaporated. The crude was dissolved in toluene (10 ml) and evaporated. The crude was dissolved in a minimum amount of $CH_2Cl_2$, precipitated by the slow addition of $Et_2O$, centrifuged (3200 rpm, 5° C.) for 10 minutes. The solids were washed with $Et_2O$, centrifuged and decanted, repeated three times. The solids were dried under vacuum, evaporated from toluene in three cycles yielding 12 (669 mg, 0.13 mmol, 68%).

$^1$H-NMR (400 MHz, $CDCl_3$) δ=6.82-6.72; (m, 4H), 6.12; (bs, 1H), 4.08; (t, J=4.6 Hz, 2H), 3.81; (t, 4.6 Hz, 2H), 3.77-3.55; (bs, 598H), 3.49-3.44; (m, 3H), 3.39; (s, 3H). mPEG5000-OH as an impurity.

Example 1f: Loading of 12 on Brominated Wang Resin (Scheme 3)

The brominated Wang resin (0.214 g, 0.235 mmol) was swelled/washed in 4 ml THF for 3×20 minutes. To phenol 12 (0.398 g, 0.078 mmol) in THF (5 ml) was added NaOEt (0.014 g, 0.180 mmol) and the mixtures was agitated at room temperature under a blanket of $N_2$. After 1.5 h the above swelled/washed resin was added in one portion and the mixture was agitated in the dark under a blanket of $N_2$. The progress of the reaction was monitored by HPLC (method 2). After 7 days no reduction in the UV active phenol peak could be detected by HPLC, indicating that no 12 had been loaded on the brominated Wang resin.

Example 2: General Procedure, Table 2: Resins for the Immobilization of Phenols

To the reaction mixture containing 2 in the indicated solvent was added the indicated base. The mixture was purged with $N_2$ and agitated at room temperature. After the indicated time (time 1), the electrophilic resin was added in one portion, purged with $N_2$, protected from light and agitated. The reaction was monitored by HPLC (method 1) and the results are reported after the indicated time (time 2).

NB! The number of equivalents is based on 17 mol % phenol in the 1 mixture.

Example 3: General Procedure, Table 3: Investigation of Dilution, Solvent, Base, Number of Equivalents of Base, Number of Equivalents of Resin and Reaction Time NB! In experiments 7 and 10 the resin wasn't swelled/washed. In experiment 20 the resin was Soxhlet extracted, dried and reswelled. In experiment 21 the resin was Soxhlet extracted and added to the reaction mixture without any further additional swelling/washing. The resin was swelled/washed in the indicated solvent for 3×20 minutes. To the reaction mixture containing 2 in the indicated solvent was added the indicated base, purged with $N_2$ and agitated/stirred. After the indicated time (time 1) the swelled/washed/Soxhlet extracted resin was added in one portion, purged with $N_2$, protected from light and agitated/stirred. The reaction was monitored by HPLC (method 1) and the results after the indicated time (time 2) are reported in Table 3.

Example 4: Small Scale Scavenging (Experiment 21, Table 3)

The brominated Wang resin (1.283 g, 1.17 mmol) was swelled/washed in a Soxhlet setup over 48 h using MTBE (60 ml) as solvent.

The mixture comprising 1 (5.001 g, 0.8 mmol total phenol (2)) was dissolved in MTBE (33 ml) in a 3 necked round bottom flask equipped with mechanical stirring. NaOEt (77 mg, 1.08 mmol) was added and the mixture was stirred under an atmosphere of $N_2$. After 70 minutes all of the masked phenol had been converted to phenol (2) (17%, FIG. 2) and the above swelled/washed brominated Wang resin was added in one portion. The mixture was stirred gently and protected from light under an atmosphere of $N_2$. After 22 h the phenol (2) content was 1% (FIG. 3), the resin was allowed to settle and the liquid was removed using a filter stick. The resin was washed 3 times with MTBE (24 ml), the filtrates were combined, filtered through a glass fibre filter and evaporated yielding purified dipod mixture (3.6 g, 86% yield calculated on 94% of phenol (2) removed).

Example 5: Large Scale Scavenging (Experiment 23, Table 3)

The brominated Wang resin (351 g, 386 mmol) was swelled/washed with MTBE (2.7 L) batchwise in a 5 L flask equipped with mechanical stirring (Teflon coated double moon blade stirrer, 100 rpm) protected from light under an atmosphere of $N_2$ until no resin extractables/leachables could be detected by HPLC/gravimetric analysis and no oligostyrene could be detected by NMR. 32 g of the swelled/washed resin was removed and not used in the following scavenging process. NB! the solvent from the washings was distilled and reused in the following washings. The reaction mixture described in Scheme 1 (1048 g, 165 mmol impurity) was dissolved in MTBE (6.5 L) in a 10 L Duran bottle equipped with mechanical stirring (Teflon coated double moon blade stirrer, 100 rpm). After 3 vacuum/nitrogen cycles, NaOEt (18.8 g, 271 mmol) was added and the mixture was stirred (175 rpm) at room temperature under an atmosphere of $N_2$ for 65 minutes, after which the phenol (2) content was 19%. The above swelled/washed resin was added via cannula vacuum transfer to the mixture in one portion. The mixture was protected from light and stirred gently (100 rpm) under an atmosphere of $N_2$. After 17.5 h the phenol content was 1%, the liquid was removed using a filter stick, the resin was washed 2 times with MTBE (1.8 L, 30 minutes per cycle). The fractions were combined, filtered through double glass fibre filters and evaporated yielding purified dipod mixture (788 g, 89% yield calculated on 94% phenol (2) removed).

The invention claimed is:

1. A method of immobilizing a phenolic compound having a $M_w \geq 500$ g/mol, wherein the method comprises the steps of:
   ionizing the phenolic compound by subjecting it to a base; and
   contacting, under agitation, the ionized phenolic compound with a cross-linked resin comprising the functionality of —C(=O)—CHXCH$_2$R, wherein X is selected from the group consisting of Br, Cl, I, CN, OMs, OTs, and OTf; and R is H, CH$_3$ or a branched or unbranched alkyl having 1 to 8 carbon atoms.

2. The method according to claim 1, wherein said phenolic compound has a $M_w \geq 750$ g/mol.

3. The method according to claim 1, wherein said phenolic compound has a $M_w$ of 500 g/mol to 2,000 g/mol.

4. The method according to claim 1, wherein said functionality of —C(=O)—CHXCH$_2$R is a α-haloketo group.

5. A method according to claim 4, wherein said cross-linked resin is a cross-linked polymer resin, comprising the functionality of 6. The method according to claim 1, wherein said base is selected from the group consisting of an alkali metal hydride, an alkaline earth metal hydride, a sterically hindered alkoxide, a strong amidine base, an amide base, and a phosphazene base.

7. The method according to claim 1, wherein said step of contacting is performed in the presence of the base and a solvent.

8. The method according to claim 7, wherein said solvent is selected from the group consisting of THF, MTBE, dioxane, cyclopentylmethyl ether, dibutylether, toluene, dichloromethane, DMF, NMP, and MeCN.

9. The method according to claim 7, wherein said cross-linked resin has a swelling factor of 1-5.5 in the given solvent.

10. The method according to claim 1, wherein said phenolic compound has a $M_w \geq 1,000$ g/mol.

11. A method of removing phenolic compounds having a $M_w \geq 500$ g/mol from a composition comprising compounds having at least one alkoxysilane group, wherein the alkoxysilane group is —SiR$^1$R$^2$R$^3$, and
   wherein
   R$^1$ is —O(CH$_2$)$_x$—CH$_3$, wherein x=0 to 7;
   R$^2$ is the same as R$^1$ or OH;
   R$^3$ is the same as R$^1$ or OH;
   and wherein the method comprises the steps of:
   ionizing the phenolic compound by subjecting it to a base; and
   contacting, under agitation, the ionized phenolic compound with a cross-linked resin comprising the functionality of —C(=O)—CHXCH$_2$R, wherein X is selected from the group consisting of Br, Cl, I, CN, OMs, OTs, and OTf; and R is H, CH$_3$ or a branched or unbranched alkyl having 1 to 8 carbon atoms.

12. The method according to claim 11, wherein said base is CH$_3$—(CH$_2$)$_y$—O—Y; wherein y=0 to 7; wherein y=x; and Y is Na, K, or Li.

13. A method of removing a phenolic compound having a $M_w \geq 500$ g/mol from a mixture, wherein the method comprises the steps of:

ionizing the phenolic compound by subjecting it to a base; and contacting, under agitation, the ionized phenolic compound with a cross-linked resin comprising the functionality of —C(=O)—CHXCH$_2$R, wherein X is selected from the group consisting of Br, Cl, I, CN, OMs, OTs, and OTf; and R is H, CH$_3$ or a branched or unbranched alkyl having 1 to 8 carbon atoms.

* * * * *